US008629627B2

(12) United States Patent
Cohen et al.

(10) Patent No.: US 8,629,627 B2
(45) Date of Patent: Jan. 14, 2014

(54) MULTI-TRANSFORMER LLC RESONANT CONVERTER CIRCUITS AND METHODS

(75) Inventors: Isaac Cohen, Dix Hills, NY (US); Bing Lu, Manchester, NH (US)

(73) Assignee: Texas Instruments Incorporated, Dallas, TX (US)

( * ) Notice: Subject to any disclaimer, the term of this patent is extended or adjusted under 35 U.S.C. 154(b) by 623 days.

(21) Appl. No.: 12/826,141

(22) Filed: Jun. 29, 2010

(65) Prior Publication Data

US 2011/0316430 A1 Dec. 29, 2011

(51) Int. Cl.
*H05B 37/02* (2006.01)
*H02M 3/335* (2006.01)

(52) U.S. Cl.
USPC .................. 315/291; 315/276; 315/277

(58) Field of Classification Search
USPC .......... 315/200 R, 209 R, 224, 258, 276–283, 315/291, 307; 363/16–21.04, 39, 40, 131, 363/132
See application file for complete search history.

(56) References Cited

U.S. PATENT DOCUMENTS

| | | | | |
|---|---|---|---|---|
| 5,684,678 | A | * | 11/1997 | Barrett .............................. 363/17 |
| 6,344,979 | B1 | * | 2/2002 | Huang et al. ...................... 363/16 |
| 7,573,729 | B2 | * | 8/2009 | Elferich et al. ............ 363/21.02 |
| 2008/0298093 | A1 | | 12/2008 | Jin et al. |
| 2010/0052568 | A1 | | 3/2010 | Cohen |

OTHER PUBLICATIONS

Brown, Jess, "Smart Rectification Benefits Half-Bridge Converters", Mar. 2006, Power Electronics Technology, pp. 24-30.
Choi, Hangseok, "Design Considerations for an LLC Resonant Converter", Nov. 20, 2007, Fairchild Semiconductor, TechOnline Webinar—PowerPoint Presentation, pp. 1-29.
"Design Considerations for an LLC Resonant Converter", Nov. 2007, Fairchild Semiconductor, TechOnline Webinar—Transcript, pp. 1-35.
Walding, Carl, "LLC Resonant Topology Lowers Switching Losses, Boosts Efficiency", Aug. 28, 2008, Green Supply Line, www.greensupplyline.com/210201210 (Downloaded on Dec. 16, 2009).

* cited by examiner

*Primary Examiner* — Jimmy Vu
(74) *Attorney, Agent, or Firm* — William B. Kempler; Wade J. Brady, III; Frederick J. Telecky, Jr.

(57) ABSTRACT

In a first aspect, an LLC resonant converter is provided for driving a plurality of output circuits from a DC input signal. The LLC resonant converter includes: (a) an inverter circuit for converting the DC input signal to a square-wave signal; (b) an inductor network coupled to the inverter circuit; and (c) a plurality of transformers, each transformer including a primary winding and a secondary winding. The primary windings of the transformers are coupled in series, and the series-coupled primary windings are coupled in parallel with the inductor network. The secondary winding of each transformer is coupled to and provides a current to a corresponding one of the output circuits. The secondary winding currents are substantially equal, and power is processed by a single transformer between the DC input signal and each output circuit. Numerous other aspects are also provided.

20 Claims, 9 Drawing Sheets

MULTI-TRANSFORMER LLC RESONANT CONVERTER CIRCUITS AND METHODS

BACKGROUND

This invention relates generally to power conversion systems. More particularly, this invention relates to LLC resonant converter circuits that include multiple transformers for providing substantially matched currents to multiple output loads.

In some electronic circuit applications, to reduce size and weight and to minimize cost, a single power supply may be used to supply matched currents to multiple load circuits. For example, in a light-emitting diode ("LED") television, a single LLC resonant converter may be used to drive multiple LED strings, where each LED string includes multiple series-connected LEDs, with the same current supplied to each LED string.

One such previously known LLC resonant converter circuit, referred to as multi-transformer LLC resonant converter 10, is illustrated in FIG. 1. Multi-transformer LLC resonant converter 10 includes inverter 14, resonant capacitor 15, transformers 16$_1$ and 16$_2$, and rectifier/filter circuits 18$_1$ and 18$_2$, respectively, and provides substantially equal output currents $I_1$ and $I_2$ to LED strings 12$_1$ and 12$_2$, respectively. Transformer 16$_1$ includes leakage inductance $L_{s1}$ and magnetizing inductance $L_{p1}$, and transformer 16$_2$ includes leakage inductance $L_{s2}$ and magnetizing inductance $L_{p2}$. Primary windings $P_1$ and $P_2$ of transformers 16$_1$ and 16$_2$, respectively, are coupled together in series, and the series-coupled primary windings are coupled to inverter 14 via resonant capacitor 15.

For high efficiency, LLC resonant converters are typically operated using primary-side zero voltage switching ("ZVS"), which requires large magnetizing currents $I_{1p1}$ and $I_{1p2}$. Indeed, $I_{1p1}$ and $I_{1p2}$ may be a large fraction of primary currents $I_{p1}$ and $I_{p2}$. To supply matched output currents $I_1$ and $I_2$ to LED strings 12$_1$ and 12$_2$, primary currents $I_{p1}$ and $I_{p2}$ must be matched. As a result, to provide substantially equal primary currents $I_{p1}$ and $I_{p2}$, magnetizing currents $I_{1p1}$ and $I_{1p2}$ must be substantially equal, which requires that the tolerance of magnetizing inductances $L_{p1}$ and $L_{p2}$ must be impractically small.

One previously known LLC resonant converter circuit, referred to as LLC resonant converter 10', that attempts to solve this problem is illustrated in FIG. 2. In particular, LLC resonant converter 10' includes an additional transformer 16$_3$ between inverter 14 and resonant capacitor 15 and transformers 16$_1$' and 16$_2$'. In this circuit, a single magnetizing inductance $L_{p3}$ of transformer 16$_3$ provides the necessary shunt inductance of the LLC resonant converter. As a result, the magnetizing inductances of transformers 16$_1$' and 16$_2$' can be made very large, which renders the effect of any magnetizing inductance tolerances insignificant.

However, the circuit of FIG. 2 has several significant disadvantages. First, the power from the DC input Vin to each output must be processed through two transformer stages, which degrades efficiency. In addition, because transformer 16$_3$ must be sized for the full output power, the size and material cost of transformer 16$_3$ are substantial.

Accordingly, improved LLC resonant converter circuits for driving multiple loads with substantially matched output currents are desirable.

SUMMARY

In a first aspect of the invention, an LLC resonant converter is provided for driving a plurality of output circuits from a DC input signal, the converter including: (a) an inverter circuit for converting the DC input signal to a square-wave signal; (b) an inductor network coupled to the inverter circuit; and (c) a plurality of transformers, each transformer including a primary winding and a secondary winding. The primary windings of the transformers are coupled in series, and the series-coupled primary windings are coupled in parallel with the inductor network. The secondary winding of each transformer is coupled to and provides a current to a corresponding one of the output circuits. The secondary winding currents are substantially equal, and power is processed by a single transformer between the DC input signal and each output circuit.

In a second aspect of the invention, an LLC resonant converter is provided for driving a plurality of output circuits from a DC input signal, the converter including: (a) an inverter circuit for converting the DC input signal to a square-wave signal; (b) an inductor network coupled to the inverter circuit; and (c) a plurality of transformers coupled to the inductor network, each transformer including a primary winding, and a secondary winding. The primary windings of the transformers are coupled in series, and the secondary winding of each transformer is coupled to and provides a current to a corresponding one of the output circuits. The secondary winding currents are substantially equal, and the inductor network is separate from the plurality of transformers.

In a third aspect of the invention, a method is provided for driving a plurality of output circuits from a DC input signal, the method including providing an LLC resonant converter having: (a) an inverter circuit for converting the DC input signal to a square-wave signal; (b) an inductor network coupled to the inverter circuit; and (c) a plurality of transformers, each transformer including a primary winding and a secondary winding. The primary windings of the transformers are coupled in series, and the series-coupled primary windings are coupled in parallel with the inductor network. The secondary winding of each transformer is coupled to and provides a current to a corresponding one of the output circuits. The secondary winding currents are substantially equal, and power is processed by a single transformer between the DC input signal and each output circuit. The method further includes driving the plurality of output circuits with the LLC resonant converter.

Other features and aspects of the present invention will become more fully apparent from the following detailed description, the appended claims and the accompanying drawings.

BRIEF DESCRIPTION OF THE DRAWINGS

Features of the present invention can be more clearly understood from the following detailed description considered in conjunction with the following drawings, in which the same reference numerals denote the same elements throughout, and in which.

DETAILED DESCRIPTION

In some embodiments, a multiple-transformer resonant converter circuit in accordance with this invention uses a shunt inductor that is separate from the transformers of the circuit. As a result, the magnetizing inductance of each transformer in the circuit can be made very large, thus minimizing the effect of magnetizing inductor mismatches between transformers. Some exemplary embodiments of this invention may also use a series resonant inductor that is separate from the transformers of the circuit. In such embodiments, the leakage inductance of each transformer can be made very small, and approximately "ideal" transformers may be used (e.g., transformers that have approximately zero leakage inductance and infinite magnetizing inductance). In exemplary embodiments of this invention, the separate series resonant inductor and/or shunt inductor may be discrete inductors. In alternative exemplary embodiments of this invention, the separate series resonant inductor and shunt inductor may be integrated inductors. LLC resonant converter circuits in accordance with this invention may be used to drive one, two, or more LED strings (or any other suitable loads) per transformer.

Figure 1:
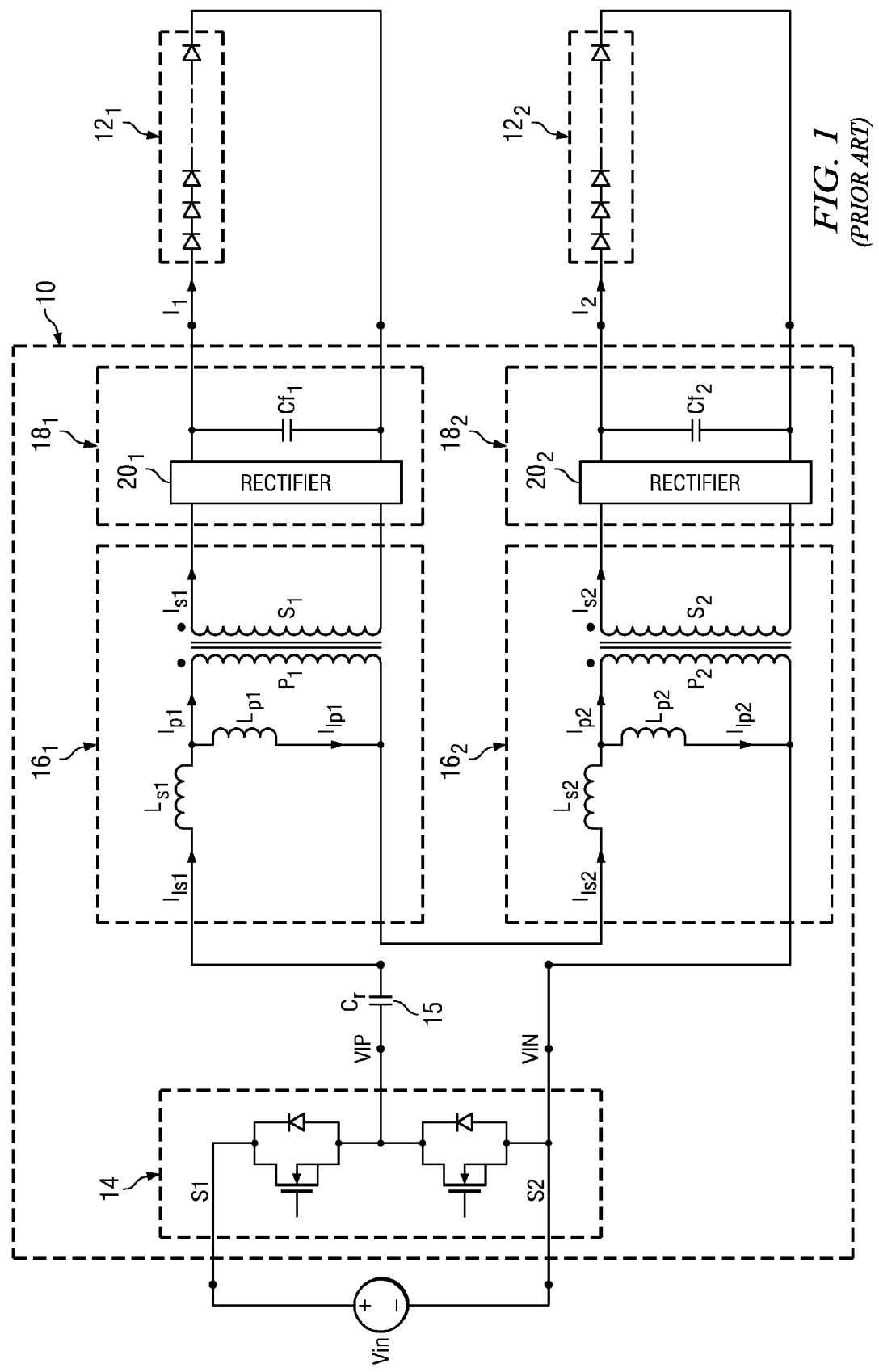
FIG. 1 is a block diagram of a previously known multiple-transformer LLC resonant converter circuit.
Figure 3:
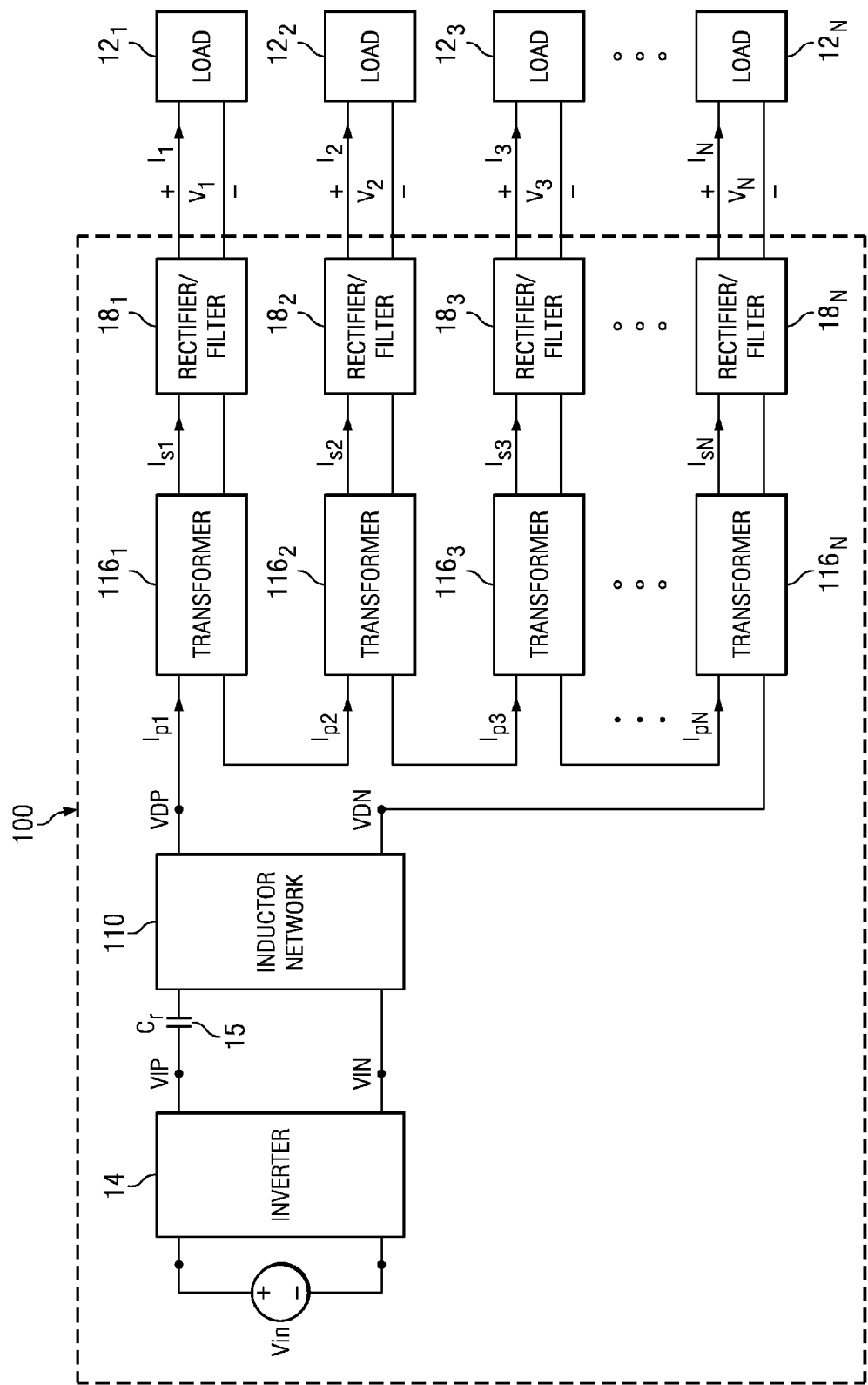
FIG. 3 is a block diagram of an exemplary multiple-transformer LLC resonant converter circuit in accordance with this invention.

Referring to FIG. 3, a block diagram of an exemplary multiple-transformer LLC resonant converter in accordance with this invention is described. In particular, exemplary multiple-transformer LLC resonant converter 100 includes inverter 14, resonant capacitor 15, inductor network 110, transformers $116_1, 116_2, \ldots, 116_N$, and rectifier/filter circuits $18_1, 18_2, \ldots, 18_N$. Any number of transformers and rectifier/filters may be used to drive a corresponding number of loads. Inverter 14 may be a half-bridge inverter as shown in FIG. 1, or may be a full-bridge inverter, or other similar circuit, as is known in the art. Under the operation of control circuitry (not shown), inverter 14 converts DC input signal Vin to a square-wave output signal at output nodes VIP and VIN. Inductor network 110 has input terminals coupled to resonant capacitor 15 and inverter output nodes VIP and VIN, and provides an output signal at output nodes VDP and VDN.

Transformers $116_1, 116_2, \ldots, 116_N$ each have primary windings and secondary windings (not shown), and convert their primary currents $I_{p1}, I_{p2}, \ldots, I_{pN}$ to secondary currents $I_{s1}, I_{s2}, \ldots, I_{sN}$, respectively. The primary windings of transformers $116_1, 116_2, \ldots, 116_N$ are coupled together in series, and the series-coupled primary windings are coupled in parallel across inductor network output nodes VDP and VDN. As described in more detail below, secondary currents $I_{s1}, I_{s2}, \ldots, I_{sN}$ are substantially equal to one another.

Rectifier/filter circuits $18_1, 18_2, \ldots, 18_N$ produce DC output voltages $V_1, V_2, \ldots, V_N$, respectively, and supply output currents $I_1, I_2, \ldots, I_N$, respectively, to load circuits $12_1, 12_2, \ldots, 12_N$, respectively. Exemplary rectifier/filter circuits $18_1, 18_2, \ldots, 18_N$ are described in more detail below. Load circuits $12_1, 12_2, \ldots, 12_N$ may be LED strings, or may be any other load circuits. In accordance with this invention, output currents $I_1, I_2, \ldots, I_N$ are substantially equal to one another.

Figure 4:
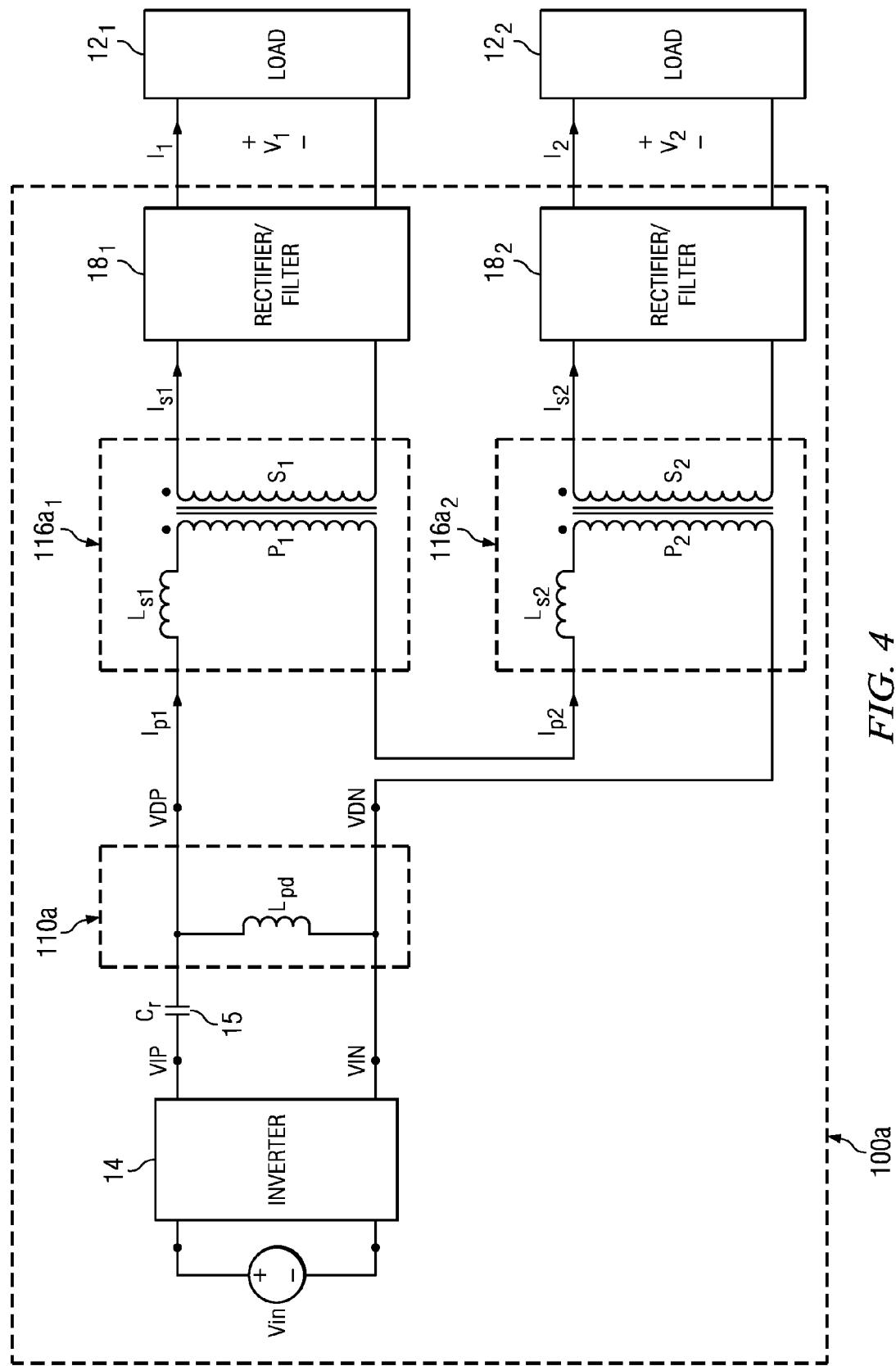
FIG. 4 is a more detailed block diagram of an exemplary multiple-transformer LLC resonant converter circuit in accordance with this invention.

Referring now to FIG. 4, an exemplary multiple-transformer LLC resonant converter 100a in accordance with this invention is described that includes a shunt inductor separate from the transformers of the circuit. In particular, multiple-transformer LLC resonant converter 100a includes inductor network 110a and series-coupled transformers $116a_1$ and $116a_2$, and produces output voltages $V_1$ and $V_2$ to load circuits $12_1$ and $12_2$. In general, any number of transformers, rectifier/filters and loads may be used.

Inductor network 110a includes a first inductor $L_{pd}$ coupled to resonant capacitor 15 and inverter output nodes VIP and VIN and series-coupled transformers $116a_1$ and $116a_2$. Transformers $116a_1$ and $116a_2$ include leakage inductances $L_{s1}$ and $L_{s2}$, respectively, and also include primary windings P1 and P2, respectively, which are coupled together in series.

Figure 2:
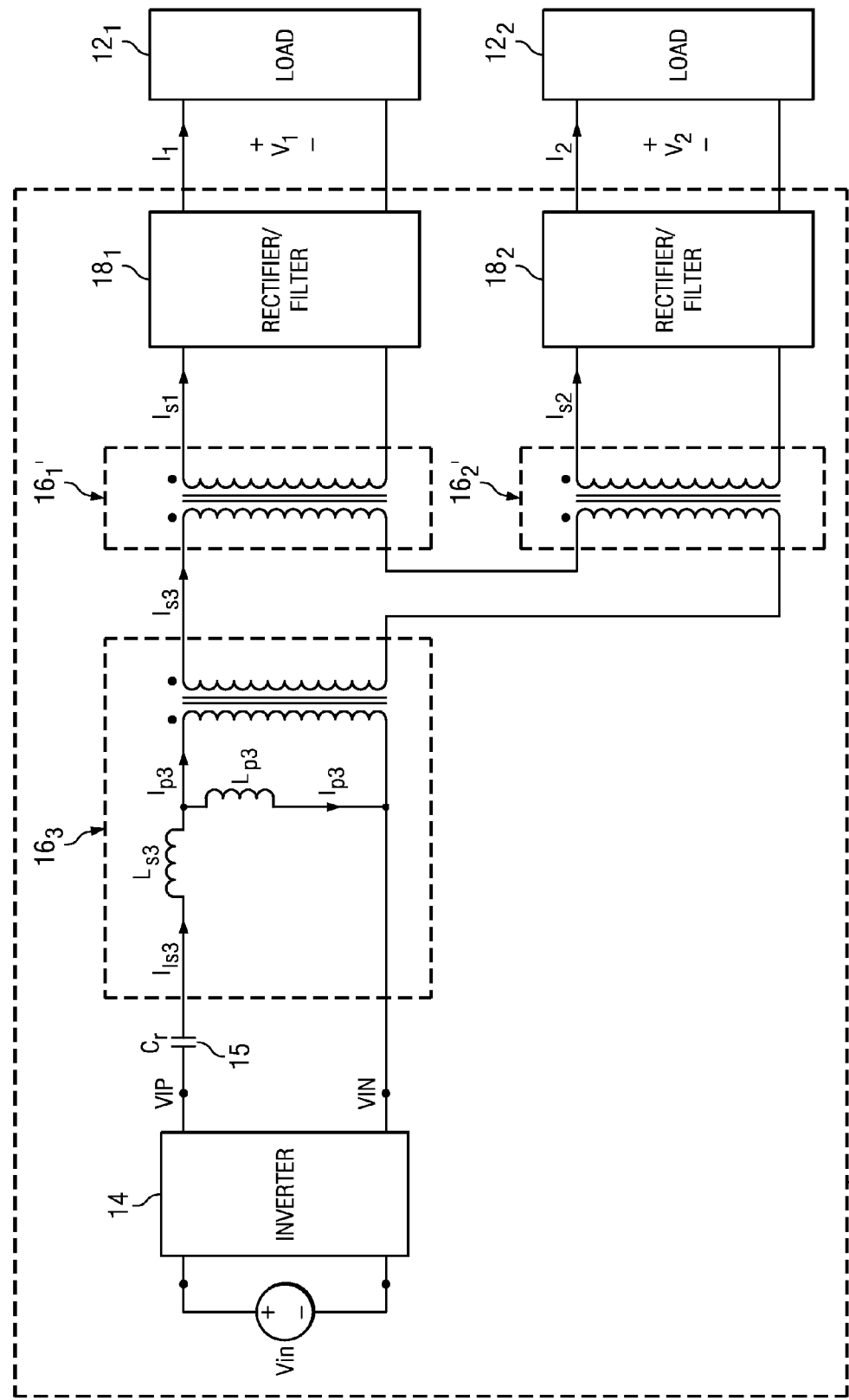
FIG. 2 is a block diagram of an alternative previously known multiple-transformer LLC resonant converter circuit.

Unlike previously known LLC resonant converters of FIGS. 1 and 2, however, first inductor $L_{pd}$ is a discrete inductor that is separate from transformers $116a_1$ and $116a_2$. First inductor $L_{pd}$ functions as a shunt inductor for multiple-transformer LLC resonant converter 100a. As a result, by using a separate shunt inductor (first inductor $L_{pd}$), the magnetizing inductances of transformers $116a_1$ and $116a_2$ (not shown in FIG. 4) can be made large to reduce the difference between primary currents $I_{p1}$ and $I_{p2}$, and thus reduce the difference between output currents $I_1$ and $I_2$.

The inductance of first inductor $L_{pd}$ depends on such factors as the voltage gain, quality factor, and switching frequency of the LLC resonant converter. In some embodiments, the inductance of first inductor $L_{pd}$ may range from about 300 µH to about 1 mH, although other values may be used.

Unlike the previously known multiple-transformer LLC resonant converter 10 of FIG. 1, secondary winding currents $I_{s1}$ and $I_{s2}$ (and output currents $I_1$ and $I_2$) can be made to substantially equal one another without having to match transformer magnetizing inductances. In addition, such current matching is substantially independent of the relative values of the transformer magnetizing inductances. Further, power from DC input Vin to each output $12_1$ and $12_2$ is processed through a single transformer stage per output stage. Thus, the efficiency of multiple-transformer LLC resonant converter 100a is likely to be greater than that of conventional LLC resonant converter 10'.

Figure 5:
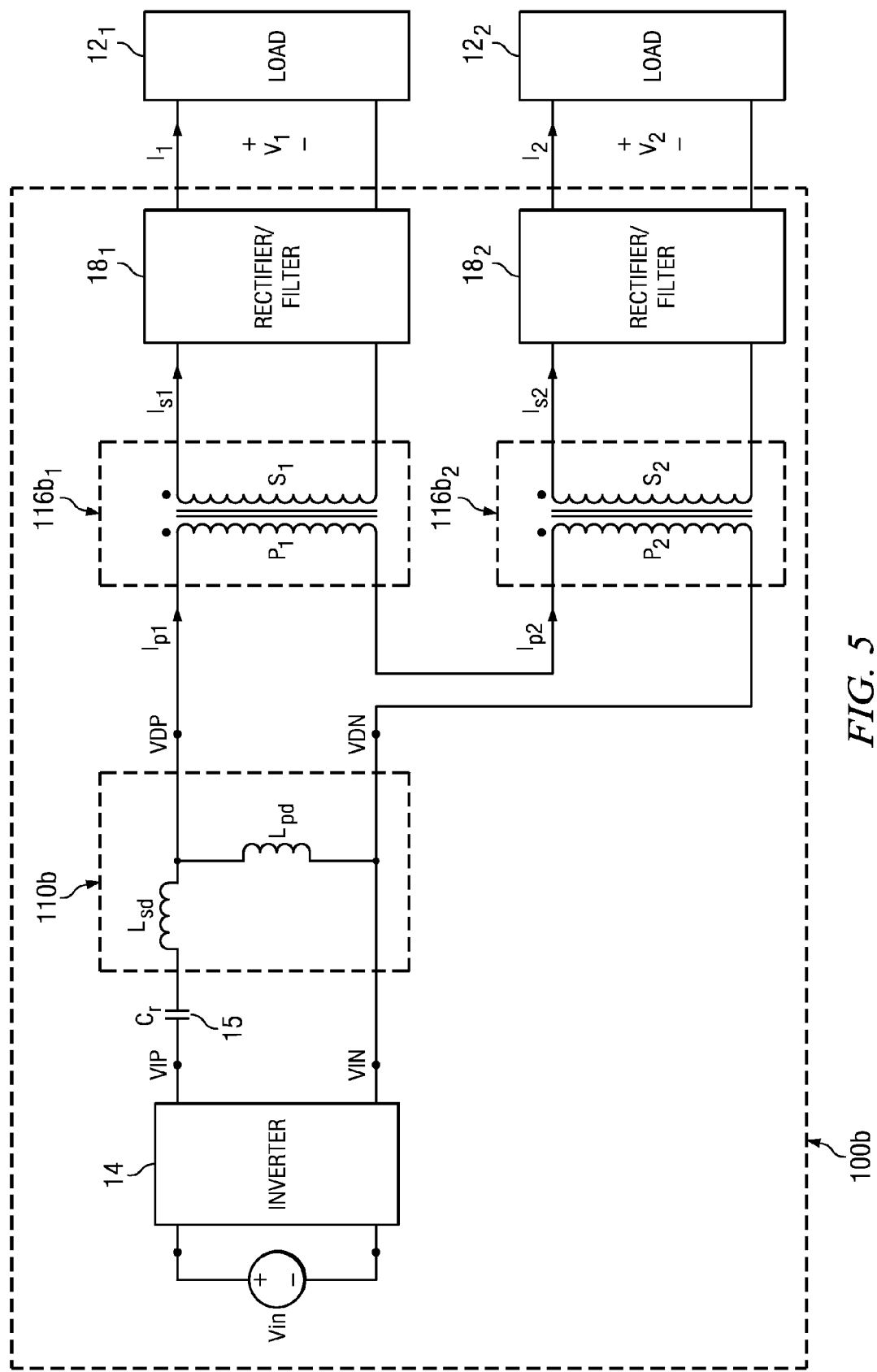
FIG. 5 is a block diagram of an alternative exemplary multiple-transformer LLC resonant converter circuit in accordance with this invention.

Referring now to FIG. 5, a block diagram of an alternative exemplary multiple-transformer LLC resonant converter 100b in accordance with this invention is described that includes a shunt inductor $L_{pd}$ and a series resonant inductor $L_{sd}$ that are both discrete inductors that are separate from the transformers of the circuit. In particular, multiple-transformer LLC resonant converter 100b includes inductor network 110b and series-coupled transformers $116b_1$ and $116b_2$.

Inductor network 110b includes a first inductor $L_{pd}$ coupled to resonant capacitor 15 and inverter output nodes VIP and VIN and series-coupled transformers $116b_1$ and $116b_2$, and a second inductor $L_{sd}$ coupled in series between inverter output node VIP and inductor network output node VDP. Transformers $116b_1$ and $116b_2$ include primary windings P1 and P2, respectively, which are coupled together in series. Transformers $116b_1$ and $116b_2$ have very small leakage inductances (not shown) and very large magnetizing inductances (not shown), and in this regard may approximate "ideal" transformers. Other numbers of transformers, rectifier/filters and loads may be used.

First inductor $L_{pd}$, and second inductor $L_{sd}$ are the shunt inductor and series resonant inductor, respectively, of multiple-transformer LLC resonant converter 100b. Unlike previously known LLC resonant converters of FIGS. 1 and 2, however, first inductor $L_{pd}$ and second inductor $L_{sd}$ are both separate from transformers $116b_1$ and $116b_2$. By using a series resonant inductor and shunt inductor that are separate from the transformer components, each magnetic component can be individually controlled and the circuit performance can be optimized. For example, converter 100b permits very precise control over the ratio $L_{pd}/L_{sd}$, which facilitates optimization of the LLC resonant converter.

The inductances of first inductor $L_{pd}$ and second inductor $L_{sd}$ depend on such factors as the voltage gain, quality factor, and switching frequency of the LLC resonant converter. In some embodiments, the inductance of first inductor $L_{pd}$ may range from about 300 µH to about 1 mH, and the inductance of second inductor $L_{sd}$ may range from about 50 µH to about 200 µH, although other values may be used.

Figure 6:
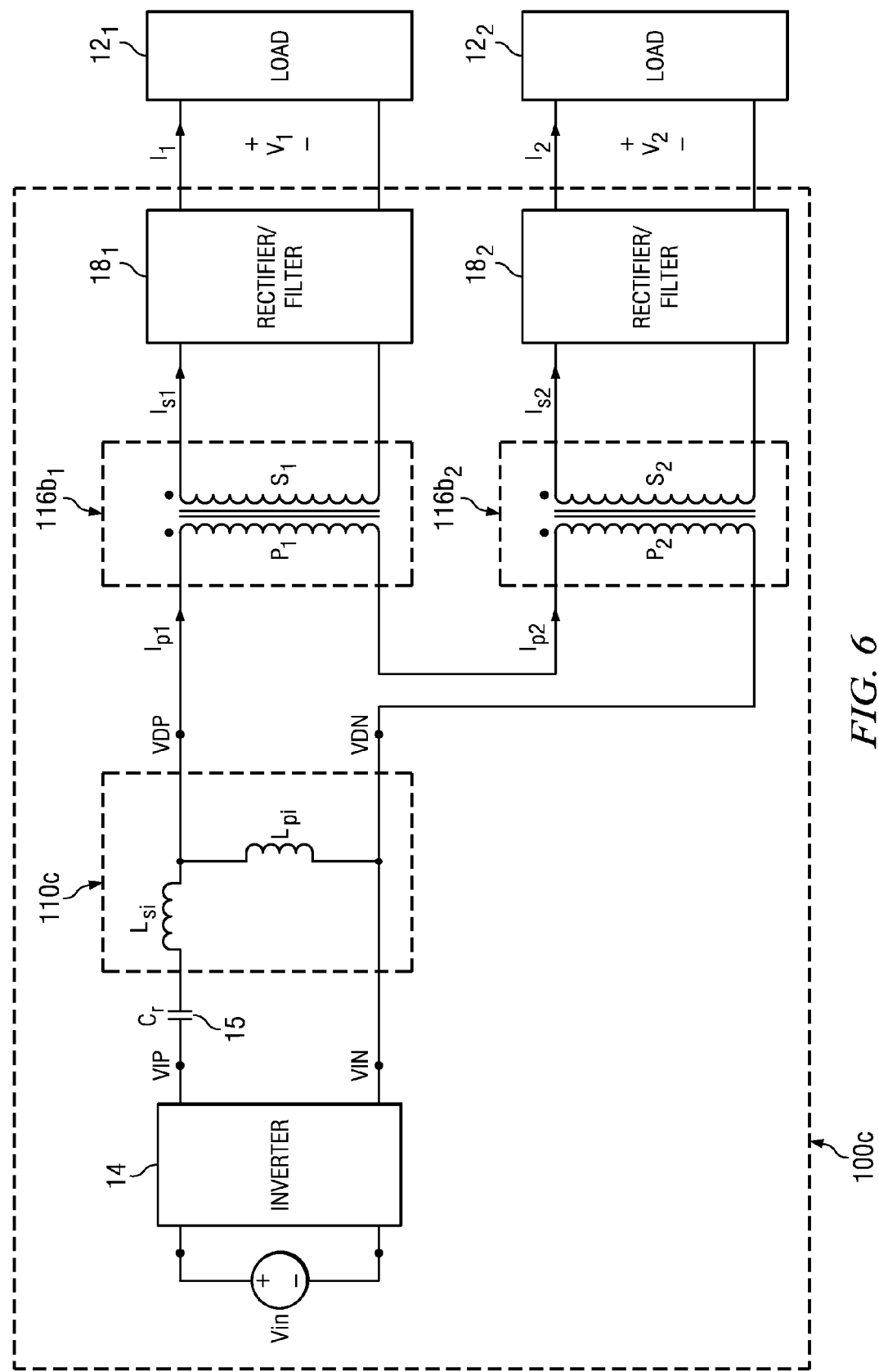
FIG. 6 is a block diagram of another alternative exemplary multiple-transformer LLC resonant converter circuit in accordance with this invention.
Figure 7:
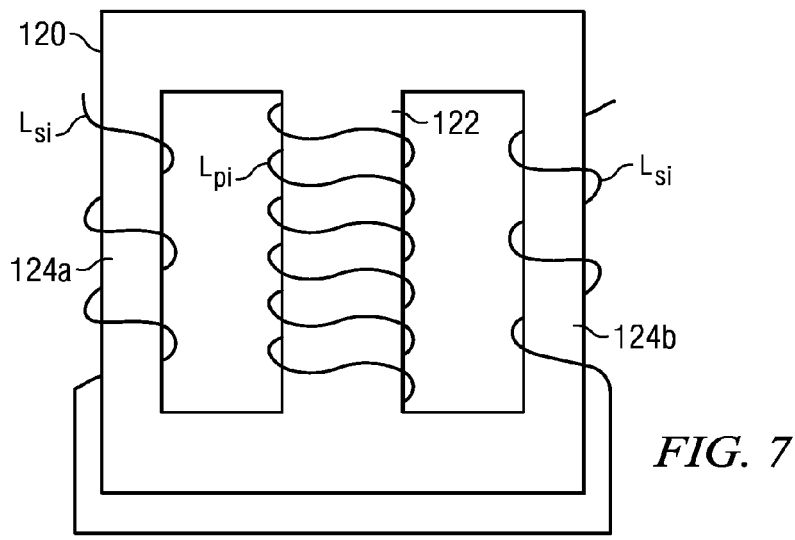
FIG. 7 is a diagram of an exemplary integrated inductor network for use in multiple-transformer LLC resonant converter circuits in accordance with this invention.

Referring now to FIG. 6, a block diagram of another alternative exemplary multiple-transformer LLC resonant converter is described that includes integrated shunt and series resonant inductors that are both separate from the transformers of the circuit. In particular, multiple-transformer LLC resonant converter 100c is similar to LLC resonant converter 100b of FIG. 5, but includes an inductor network 110c that includes a first inductor $L_{pi}$ and a second inductor $L_{si}$ that are integrated on a single magnetic core, such as an EE- or EI-core. For example, FIG. 7 illustrates an exemplary magnetic core 120 in which first inductor $L_{pi}$ is wound on the center leg 122 of core 120, and second inductor $L_{si}$ is wound in two sections on the outer legs 124a and 124b of core 120.

First inductor $L_{pi}$ and second inductor $L_{si}$ are connected in series, with the polarity selected so that flux developed by the windings in center leg 122 cancel flux developed by the windings in outer legs 124a and 124b. Persons of ordinary skill in the art will understand that second inductor $L_{si}$ alternatively may be wound on center leg 122 of core 120, and first inductor $L_{pi}$ may be wound in two sections on outer legs 124a and 124b of core 120. Persons of ordinary skill in the art also will understand that alternative integrated inductor fabrication techniques may be used to form integrated first inductor $L_{pi}$ and second inductor $L_{si}$.

Figure 8A:
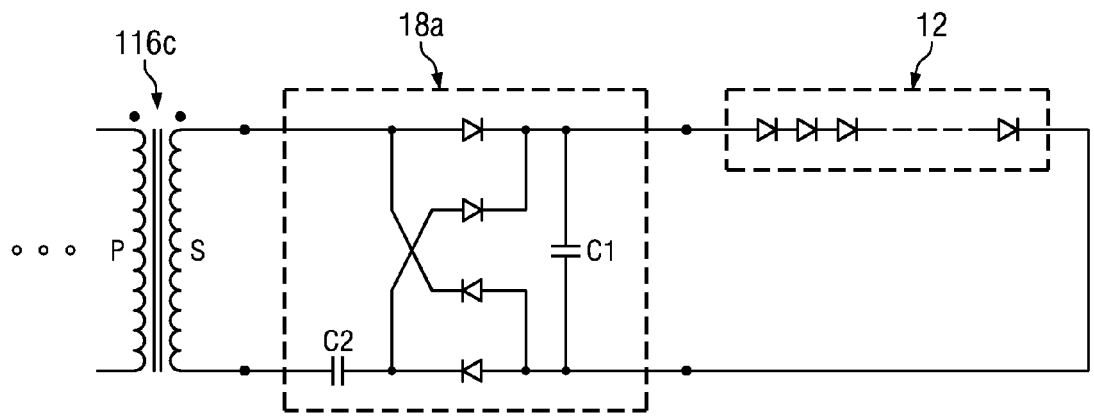
FIGS. 8A-8E are block diagrams of exemplary rectification configurations for use with multiple-transformer LLC resonant converter circuits in accordance with this invention.

Referring now to FIGS. 8A-8E, exemplary rectifier/filter circuit configurations are described that may be used in multiple-transformer LLC resonant converters of this invention. In particular, FIG. 8A illustrates a first exemplary rectifier/filter circuit 18a that includes a diode full-wave rectifier coupled to the secondary windings S of transformer 116c. Rectifier/filter circuit 18a optionally may include output capacitors C1 and/or C2 to smooth out the rectified output voltage and current supplied to LED string 12.

Figure 8B:
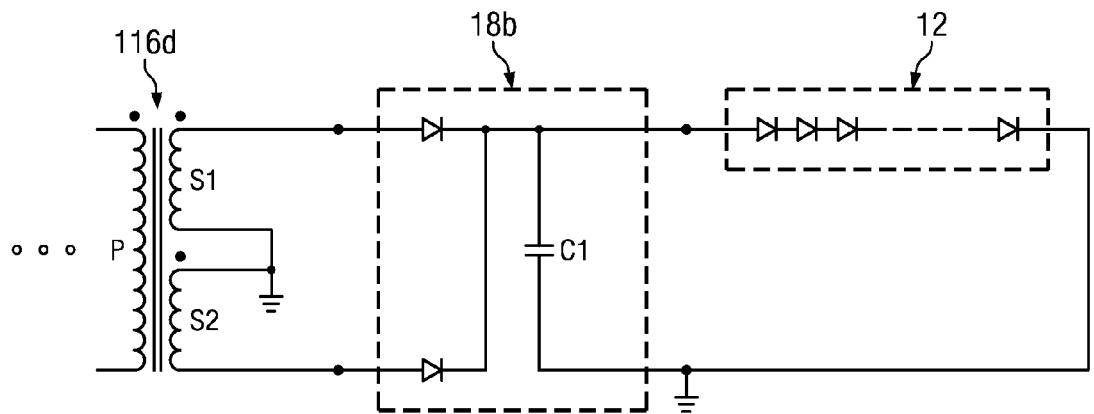

Referring now to FIG. 8B, an alternative exemplary rectifier/filter circuit 18b is described. In particular, rectifier/filter circuit 18b includes a diode rectifier coupled to the secondary windings S1 and S2 of center-tapped transformer 116d. Rectifier/filter circuit 18b optionally may include output capacitor C1 to smooth out the rectified output voltage and current supplied to LED string 12.

Figure 8C:
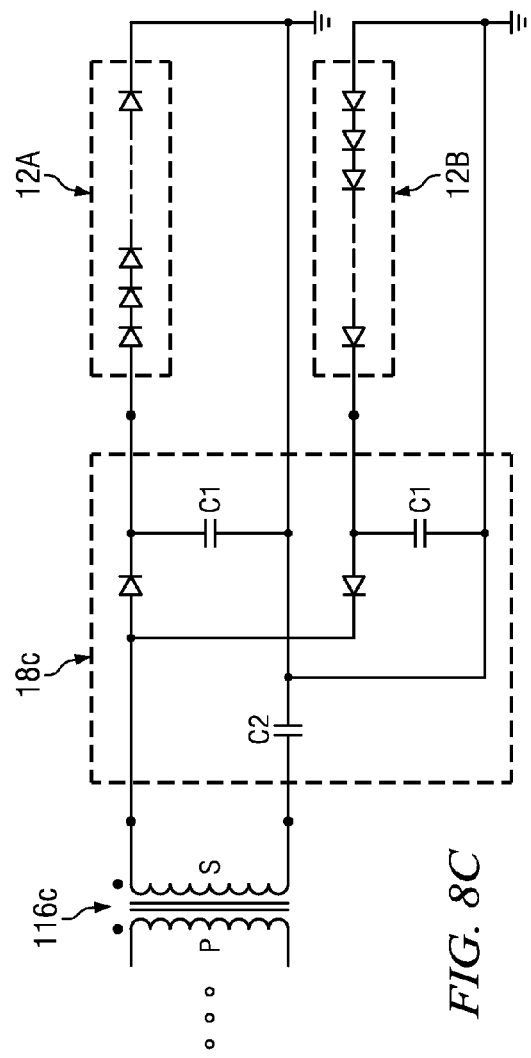

Referring now to FIG. 8C, another alternative exemplary rectifier/filter circuit 18c is described that may be used to drive a pair of LED strings 12A and 12B. In particular, rectifier/filter circuit 18c includes a diode rectifier coupled to the secondary winding S of transformer 116c. Rectifier/filter circuit 18c optionally may include output capacitors C1 and/or C2 to smooth out the rectified output voltage and current supplied to LED strings 12A and 12B.

Figure 8D:
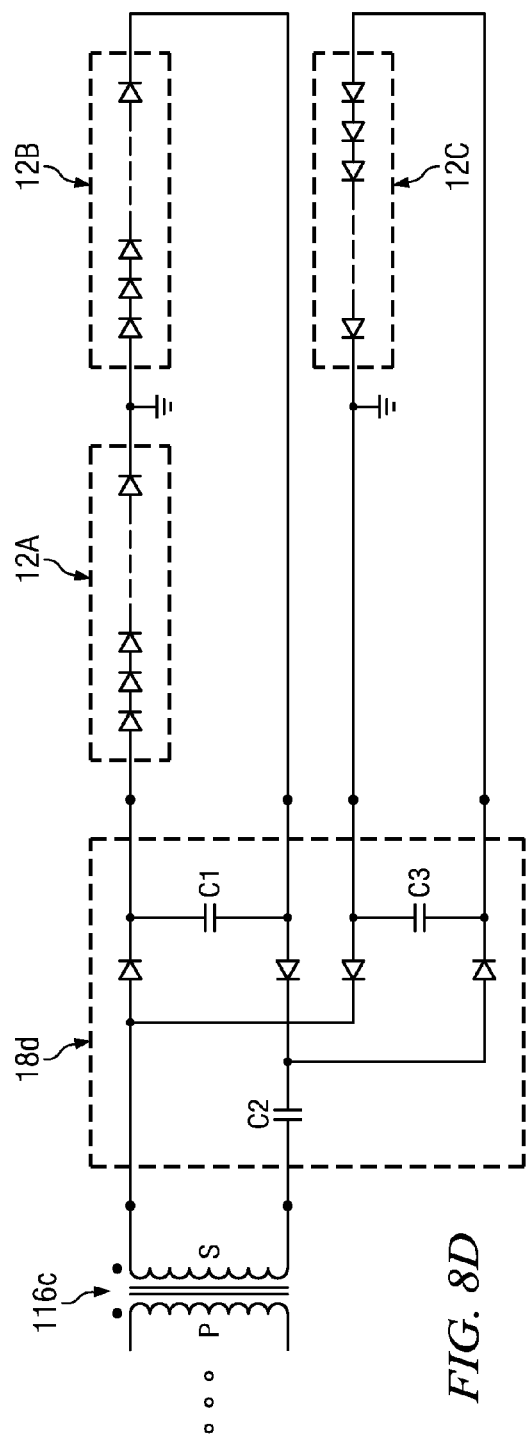

Referring now to FIG. 8D, another alternative exemplary rectifier/filter circuit 18d is described that may be used to drive three LED strings 12A, 12B and 12C. In particular, rectifier/filter circuit 18d includes a diode rectifier coupled to the secondary winding S of transformer 116a. Rectifier/filter circuit 18d optionally may include output capacitors C1, C2 and/or C3 to smooth out the rectified output voltage and current supplied to LED strings 12A, 12B and 12C.

Figure 8E:
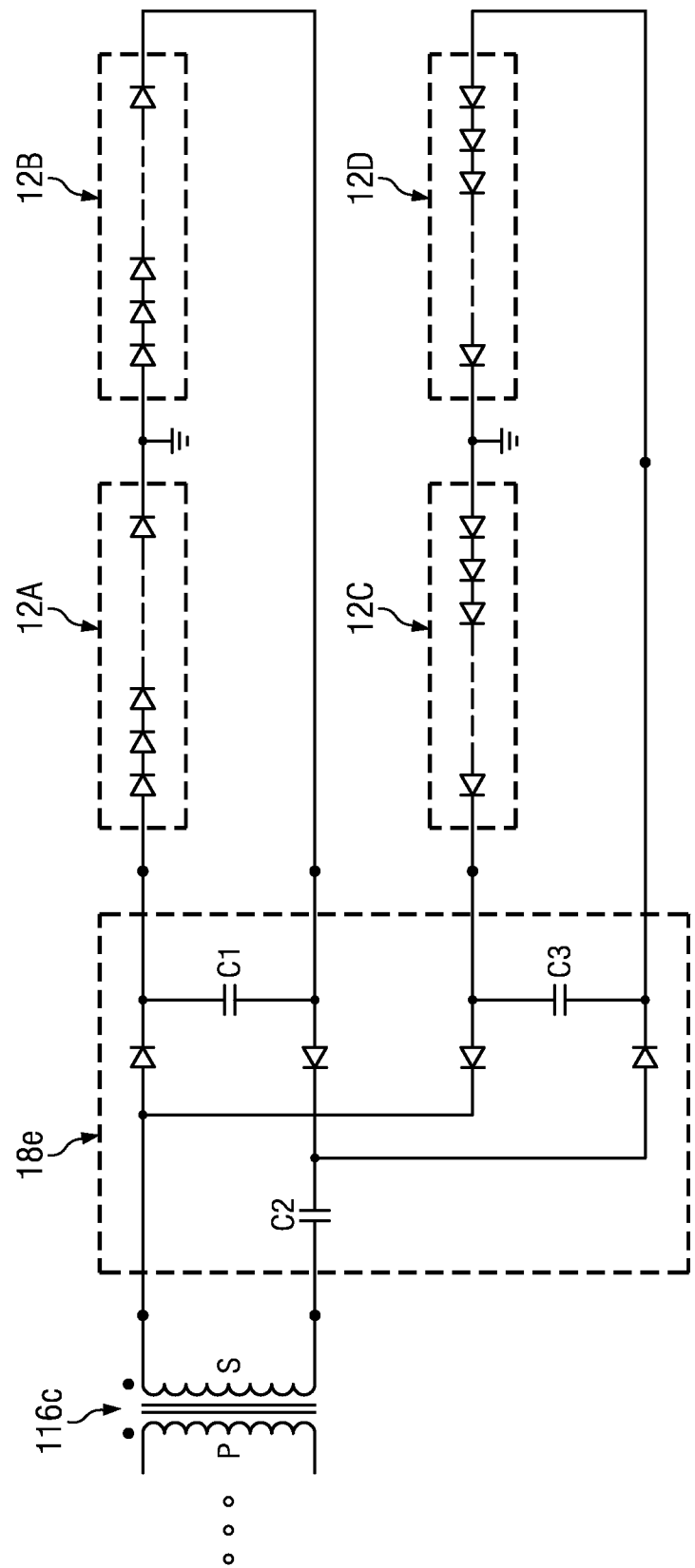

Referring now to FIG. 8E, another alternative exemplary rectifier/filter circuit 18e is described that may be used to drive four LED strings 12A, 12B, 12C and 12D. In particular, rectifier/filter circuit 18e includes a diode rectifier coupled to the secondary winding S of transformer 116a. Rectifier/filter circuit 18e optionally may include output capacitors C1, C2 and/or C3 to smooth out the rectified output voltage and current supplied to LED strings 12A, 12B, 12C and 12D.

Various modifications may be made to the exemplary LLC resonant converter circuits described above, and all such modifications are within the scope of the claimed invention. For example, a capacitor may be placed in series with the secondary winding of each transformer, coupled between the transformer and the corresponding rectifier circuit. Such a capacitor may block any DC current that results from non-ideal diode rectifiers, and/or from half-wave rectifier circuits used to drive multiple LED strings.

The foregoing merely illustrates the principles of this invention, and various modifications can be made by persons of ordinary skill in the art without departing from the scope and spirit of this invention.

The invention claimed is:

1. An LLC resonant converter for driving a plurality of output circuits from a DC input signal, the converter comprising:
    an inverter circuit for converting the DC input signal to a square-wave signal;
    a single inductor network coupled to the inverter circuit; and
    a plurality of transformers, each transformer including a primary winding and a secondary winding, the primary windings of the transformers coupled in series, the series-coupled primary windings directly connected in parallel with the inductor network, the secondary winding of each transformer coupled to and providing a current to a corresponding one of the output circuits;
    wherein the secondary winding currents are substantially equal; and
    wherein power is processed by a single transformer between the DC input signal and each output circuit and the inductor network is separately formed and independent of each single transformer.

2. The LLC resonant converter of claim 1, wherein the inductor network comprises a first inductor coupled in parallel with the series-coupled primary windings.

3. The LLC resonant converter of claim 2, wherein the inductor network further comprises a second inductor coupled in series with the series-coupled primary windings.

4. The LLC resonant converter of claim 1, wherein the inductor network comprises a discrete inductor.

5. The LLC resonant converter of claim 1, wherein the inductor network comprises integrated inductors.

6. The LLC resonant converter of claim 5, wherein the integrated inductors comprise a magnetic core comprising a center leg and a pair of outer legs.

7. The LLC resonant converter of claim 1, wherein the output circuits each comprise a string of series-coupled LEDs.

8. An LLC resonant converter circuit for driving a plurality of output circuits from a DC input signal, the converter comprising:

an inverter circuit for converting the DC input signal to a square-wave signal;
a single inductor network coupled to the inverter circuit; and
a plurality of transformers connected to the inductor network, each transformer including a primary winding and a secondary winding, the primary windings of the transformers coupled in series, the secondary winding of each transformer coupled to and providing a current to a corresponding one of the output circuits;
wherein the secondary winding currents are substantially equal; and
wherein the inductor network is separate from and independent of the plurality of transformers.

9. The LLC resonant converter of claim 8, wherein the inductor network comprises a first inductor coupled in parallel with the series-coupled primary windings.

10. The LLC resonant converter of claim 9, wherein the inductor network further comprises a second inductor coupled in series with the series-coupled primary windings.

11. The LLC resonant converter of claim 8, wherein the inductor network comprises a discrete inductor.

12. The LLC resonant converter of claim 8, wherein the inductor network comprises integrated inductors.

13. The LLC resonant converter of claim 12, wherein the integrated inductors comprise a magnetic core comprising a center leg and a pair of outer legs.

14. The LLC resonant converter of claim 8, wherein the output circuits each comprise a string of series-coupled LEDs.

15. The LLC resonant converter of claim 8, wherein the secondary winding of each transformer is coupled to and provides a current to a corresponding plurality of the output circuits.

16. A method for driving a plurality of output circuits from a DC input signal, the method comprising:
converting the DC input signal to a square-wave signal;
coupling the square wave signal via a single inductor network to a plurality of transformers, each transformer including a primary winding and a secondary winding, wherein the inductor network is separate from and independent of the plurality of transformers;
coupling the primary windings of the transformers in series;
connecting the series-coupled primary windings in parallel with the inductor network;
coupling the secondary winding of each transformer to a corresponding one of the output circuits;
providing a current from the secondary winding of each transformer to the corresponding output circuit, wherein the secondary winding currents are substantially equal; and
driving the plurality of output circuits with the LLC resonant converter.

17. The method of claim 16, wherein the inductor network comprises a first inductor, and the method further comprises coupling the first inductor in parallel with the series-coupled primary windings.

18. The method of claim 17, wherein the inductor network further comprises a second inductor, and wherein the method further comprises coupling the second inductor in series with the series-coupled primary windings.

19. The method of claim 16, wherein the inductor network comprises a discrete inductor.

20. The method of claim 16, wherein the inductor network comprises integrated inductors.

* * * * *